(12) United States Patent
Michioka et al.

(10) Patent No.: US 6,338,573 B1
(45) Date of Patent: Jan. 15, 2002

(54) UNIVERSAL GUIDE DEVICE AND MOVING TABLE DEVICE USING SAME

(75) Inventors: Hidekazu Michioka, Tokyo; Hiroaki Mochizuki, Yamanashi-ken; Kaoru Hoshide; Minoru Kouchi, both of Tokyo, all of (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/589,129

(22) Filed: Jun. 8, 2000

(30) Foreign Application Priority Data

Jun. 9, 1999 (JP) .......................... 11-162557
Sep. 29, 1999 (JP) .......................... 11-276807

(51) Int. Cl.$^7$ ............................................. F16C 29/06
(52) U.S. Cl. ........................... 384/45; 384/43; 384/44; 104/106; 104/119
(58) Field of Search .................... 105/144; 104/106, 104/119; 384/13, 15, 41, 43, 44, 45; 464/168

(56) References Cited

U.S. PATENT DOCUMENTS

| 4,245,561 | A | * | 1/1981 | Krug ........................... 104/27 |
| 4,296,974 | A | * | 10/1981 | Teramachi ................... 308/6 C |
| 4,844,624 | A | | 7/1989 | Teramachi |
| 5,076,714 | A | * | 12/1991 | Teramachi ................... 384/45 |
| 5,108,197 | A | * | 4/1992 | Morita ........................ 384/45 |
| 5,123,754 | A | * | 6/1992 | Tanaka ........................ 384/45 |
| 5,308,170 | A | | 5/1994 | Yamaguchi et al. |
| 5,411,334 | A | * | 5/1995 | Takei et al. .................. 384/45 |
| 5,575,565 | A | | 11/1996 | Takei et al. |
| 5,735,214 | A | | 4/1998 | Tsuboi |
| 6,042,269 | A | * | 3/2000 | Konomoto ................... 384/45 |

FOREIGN PATENT DOCUMENTS

DE        4022574 A1    1/1992

OTHER PUBLICATIONS

Abstract of Japanese Patent Publ. No. 63293319A; dated Nov. 30, 1988.
Abstract of Japanese Patent Publ. No. 06050333; dated Feb. 22, 1994.

* cited by examiner

Primary Examiner—S. Joseph Morano
Assistant Examiner—Frantz F. Jules
(74) Attorney, Agent, or Firm—Arent Fox Kintner Plotkin & Kahn, PLLC

(57) ABSTRACT

The present invention offers a universal guide device capable of using the sliders of conventional straight guide devices intact. The universal guide device does not need a different slider for each different radius of track rail. The universal guide device can be manufactured at lower cost than normal. This universal guide device in accordance with the invention comprises a track rail and sliders mounted to the rail via balls circulating through endless circular paths. The rail has at least one straight region and at least one curved region shaped in an arc with a given radius of curvature. Each of the sliders is of saddlelike cross section. The sliders span the rail. The sliders have ball-rolling surfaces shaped linearly. The curved region of the rail is set narrower than the straight region of the rail.

7 Claims, 19 Drawing Sheets

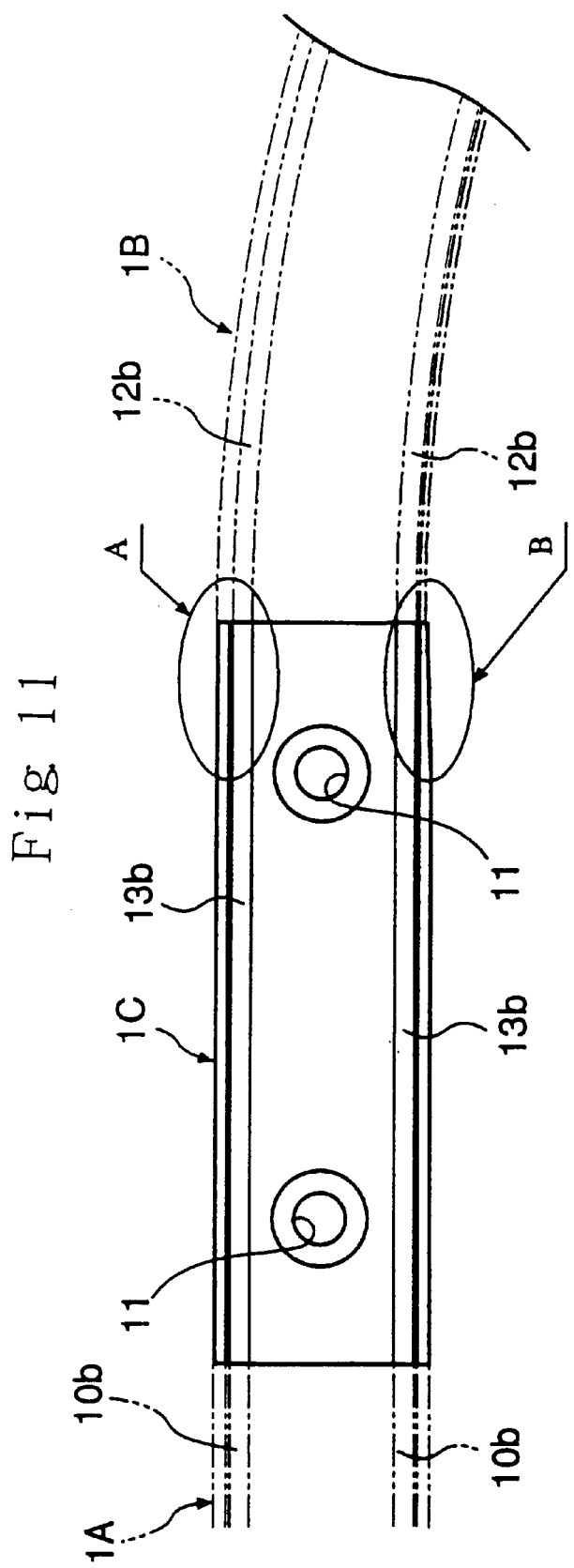

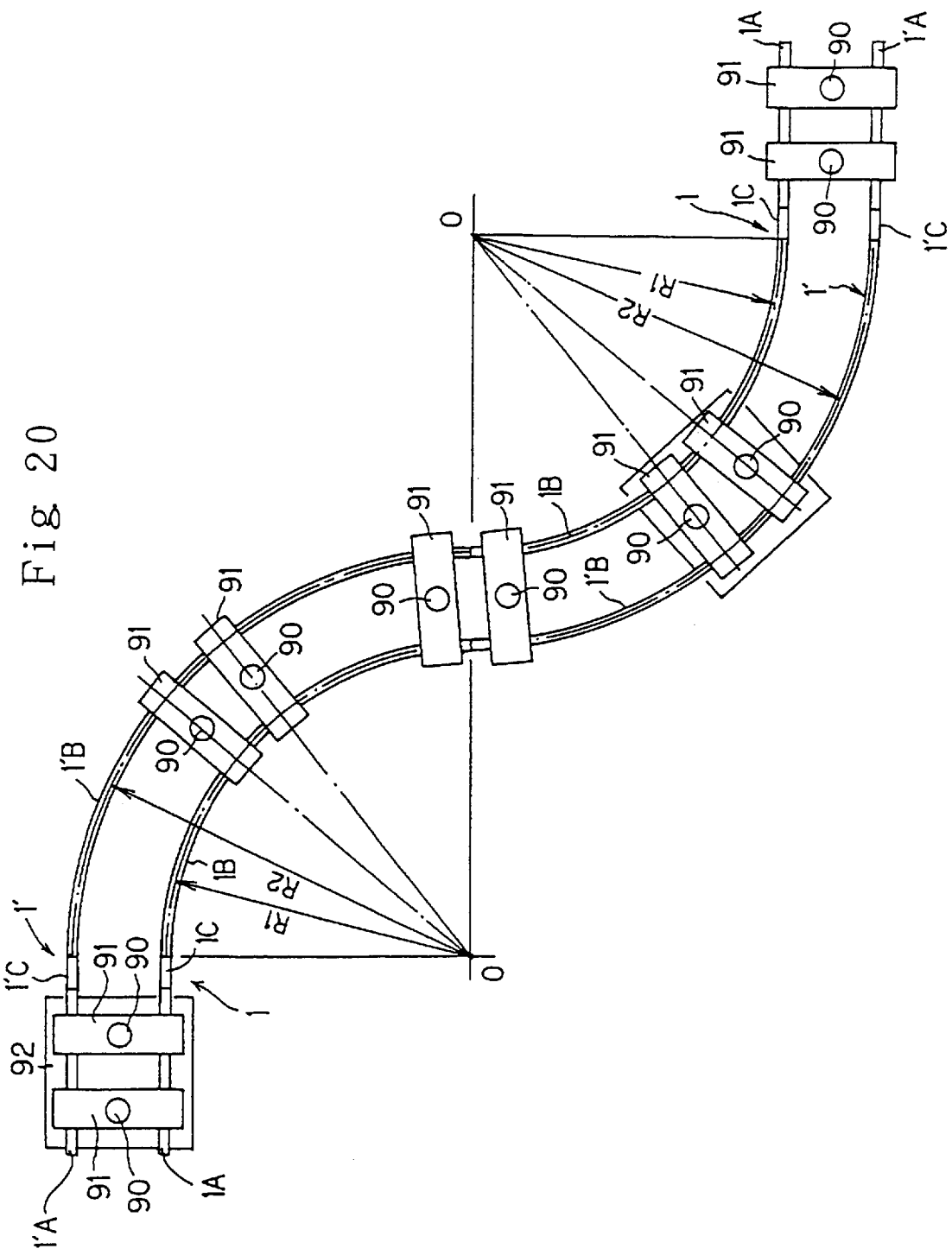

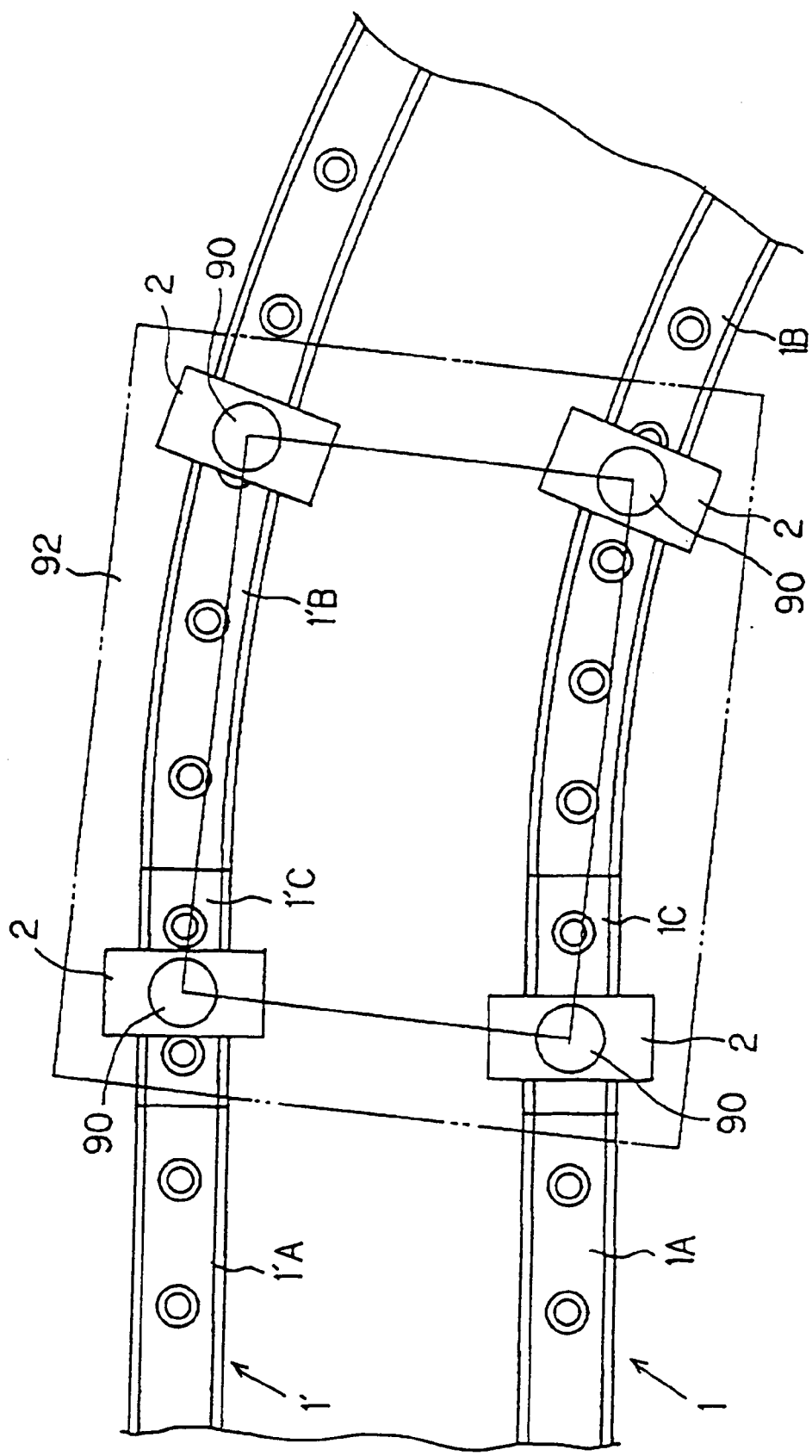

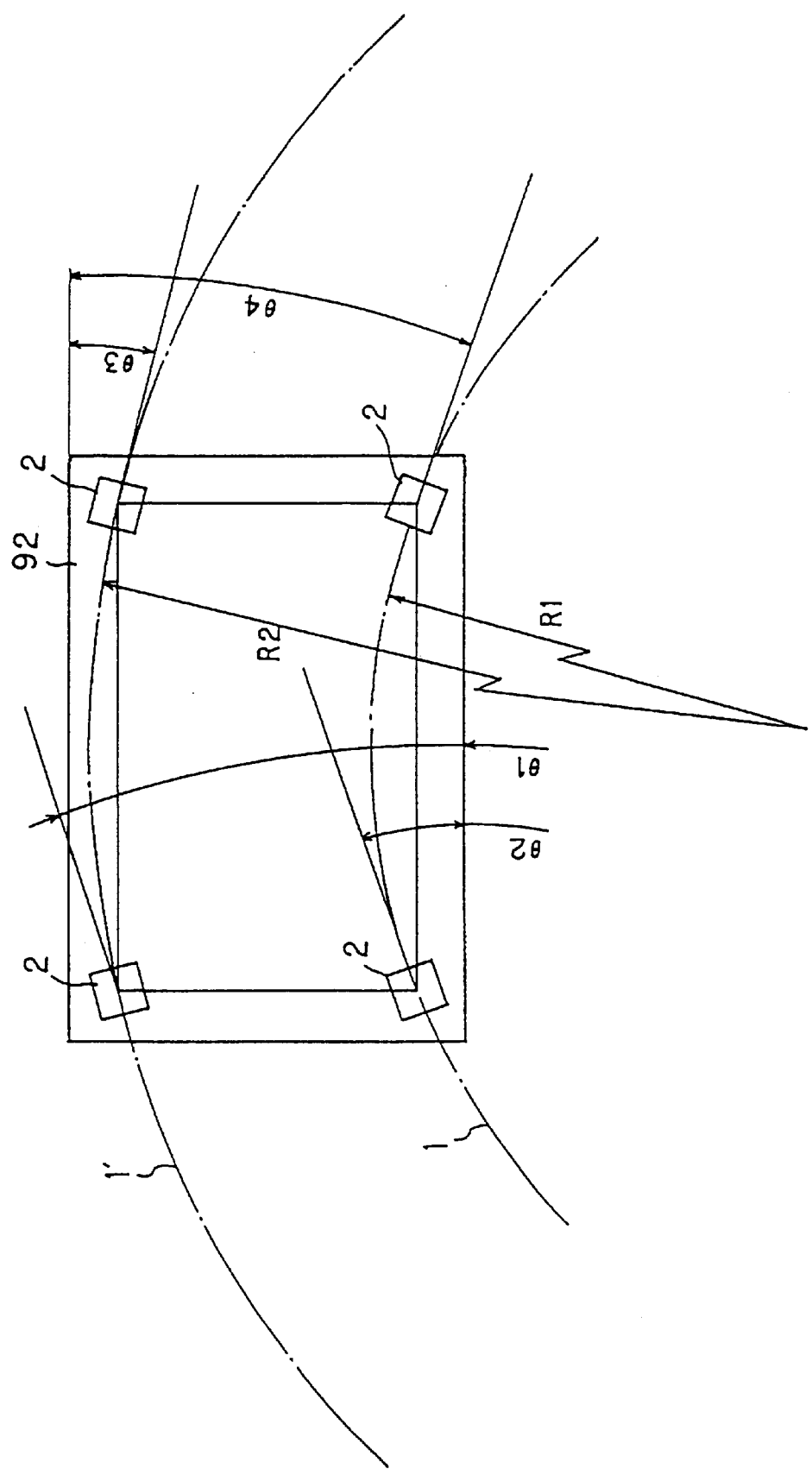

UNIVERSAL GUIDE DEVICE AND MOVING TABLE DEVICE USING SAME

FIELD OF THE INVENTION AND RELATED ART STATEMENT

1. Field of the Invention

The present invention relates to a universal guide device that is used in sliding portions of various machine tools, part-conveying systems, and so on and is capable of guiding a movable object or material over a conveyance path containing both straight and curved regions.

2. Related Art

For example, on a product line or the like in a plant, if all processing stations are arranged linearly, then no problems will take place. However, depending on the space of the plant in which a machine is installed or on the contents of the processing performed in processing stations, it may be necessary to change the direction of conveyance of materials to be processed between two adjacent processing stations. In this case, it is customary to use a pallet changer or the like to achieve a change in the direction of conveyance. Unfortunately, additional space and cost for installing the pallet changer or the like are necessary.

Known means for modifying the direction of conveyance of materials or objects without using a pallet changer include universal guide devices (as described in Laid-open, unexamined Japanese patent application Nos. 293319/1988 and 50333/1994) capable of guiding materials continuously along a path including both straight and curved lines and curved guide devices (as described in Laid-open, unexamined Japanese patent application No. 186028/1988) capable of guiding materials continuously along an annular path.

These universal guide devices and curved guide devices each comprise a track rail, a slider, and a number of balls. The rail forms longitudinally extending surfaces on which the balls roll. The slider is mounted to span the rail. Load-rolling surfaces opposite to the rolling surfaces of the rail and an endless circular path for the balls are formed on and in the slider. The endless circular path includes the load-rolling surfaces. The balls roll in the endless circular path of the slider and between the rolling surfaces of the rail and the load-rolling surfaces of the slider carry a load. The slider moves along the rail in response to rolling movement of the balls.

In the former universal guide device, each load-rolling surface of the slider is partitioned into straight load regions formed linearly and curved load regions shaped into an arc in conformity with the curvature of the rail. In each straight load region of the rail, the load acting on the slider is carried by the balls rolling in the straight load region. In each curved region, the load is carried by the balls rolling in the curved region. As a result, even if straight and curved regions are intermingled on the track rail, the slider can move along the rail through the straight and curved regions continuously.

In the latter curved guide device, the track rail is shaped into an arc having a given curvature. The load-rolling surface of the slider is shaped into an arc in conformity with the curvature of the rail. All the balls interposed between the load-rolling surface of the slider and the rolling surface of the rail roll on while carrying the load acting on the slider. In consequence, the slider can make a curved motion along the rail.

In these conventional universal guide devices and curved guide devices, the load-rolling groove or race in the slider is shaped into an arc in conformity with the curvature of the track rail to permit movement of the slider through the curved region of the rail. Therefore, it has been necessary to machine the load-rolling surface in conformity with the curvature of the rail. Consequently, it has been impossible to directly use the sliders of conventional mass-produced linear guide devices that are available in the market. Hence, the production cost is increased. Furthermore, a different slider is necessary for each different curvature of track rail. Therefore, it is laborious to machine the sliders and to manage finished products.

Where the load-rolling surface of a slider is machined into an arc, the direction of bending of the curved region of a track rail is limited to one direction, left or right. Although it is possible to transport materials and objects annularly, it is impossible to convey materials along a track including two curved regions bent in different directions such as an S-shaped track.

On the other hand, in a path between two adjacent machining stations on a product line, if materials can be transported, no problems take place. It is considered that capability to carry very large loads is not necessary in curved regions of the rail. However, during a machining process, a machining force acting on a material needs to be sustained reliably by a guide device. Straight regions of the rail are required to have ability to carry a larger load than curved regions. In the aforementioned conventional universal guide device, the load-rolling surface formed on the slider is divided into straight and curved load regions. Therefore, the straight regions of the rail have decreased ability to sustain loads. Consequently, a machining force acting on materials cannot be sufficiently sustained.

Where materials are actually transported using such universal guide devices, it is necessary to construct a moving table device from two or more universal guide devices in order to transport such materials stably. In particular, two track rails are placed parallel to each other. Plural sliders are mounted to each track rail. A table is mounted so as to span all of these sliders. The materials to be transported are placed on this table.

Where the table is moved only through a linear region or only through a curved region, if all the sliders are mounted directly to the table, no problems take place. The table can be smoothly moved. However, where the table is moved from a curved region to a straight region or vice versa continuously, if all the sliders are directly mounted to the same table, the configuration of one slider relative to the track rail is restricted by other sliders. This makes it difficult to move the table smoothly. Accordingly, where plural universal guide devices of the construction described above are used to construct the moving table device, it has been impossible to mount the sliders directly to the table.

OBJECTS AND SUMMARY OF THE INVENTION

In view of the foregoing problem, the present invention has been made. It is an object of the present invention to provide a universal guide device which can directly use sliders heretofore employed in linear guide devices and which do not need different sliders for each different radius of track rail and thus can be fabricated at lower cost than conventionally.

It is another object of the invention to provide a universal guide device in which sliders can move through two curved regions of a track rail continuously along the rail even if the two curved regions are bent in different directions and in which the sliders can move from a straight region to a curved region or vice versa continuously without sacrificing the ability of the rail to sustain a load in the straight region even if the rail contains both straight and curved regions.

It is a further object of the invention to provide a moving table device comprising plural parallel track rails and plural sliders mounted to each track rail, the moving table device being characterized in that smooth movement of the sliders is assured even if a table is supported by the sliders that are four or more in number.

To achieve the objects described above, a universal guide device in accordance with the present invention comprises: a track rail including a straight region and a curved region shaped into an arc with a given radius of curvature and having ball-rolling surfaces on both its side surfaces, the ball-rolling surfaces extending longitudinally; a slider having a saddlelike cross section and mounted to span the track rail; load-rolling surfaces formed on the slider and located opposite to the rolling surfaces, respectively, of the rail; and an endless circular path for a number of balls. The circular path is formed on the slider and includes the load-rolling surfaces. The numerous balls sustain a load between each rolling surface of the track rail and each load-rolling surface of the slider. The load-rolling surfaces formed on the slider are formed linearly. The width of the curved region of the track rail is set narrower than the straight region of the rail.

In this universal guide device in accordance with the present invention, the load-rolling surfaces formed on the slider are not shaped into an arc corresponding to the curvature of the curved region of the track rail. Rather, the load-rolling surfaces are formed linearly in conformity with the rolling surfaces of the straight region of the track rail. In the present invention, however, the curved region of the rail is set narrower than the straight region of the rail. Therefore, if the rolling surfaces of the rail assume the form of an arc, and if the load-rolling surfaces of the slider are linear, the slider can engage the curved region of the rail and can move along the curved region without trouble.

When the slider is moving through the curved region of the track rail, the balls are squeezed in between the arc-shaped rolling surfaces formed longitudinally of the rail and the linear load-rolling surfaces formed on the slider and roll along the load-rolling surfaces while carrying the load. Therefore, with respect to the numerous balls rolling on the load-rolling surfaces, only some of the balls carry the load between the rolling surfaces of the rail and the load-rolling surfaces of the slider.

In this universal guide device in accordance with the present invention, the load-rolling surfaces formed on the slider are shaped linearly rather than into an arc. Therefore, the sliders of linear guide devices can be used intact. Furthermore, an operation for machining the load-rolling surface into an arc in conformity with the curvature of the track rail is dispensed with. Therefore, it is possible to fabricate a universal guide device at quite low cost. Furthermore, the linearly formed load-rolling surfaces have no directivity. Consequently, even if two curved regions bent in different directions are contained in the rail, the slider can move through these curved regions continuously.

In addition, in the universal guide device in accordance with the present invention as described above, all the balls rolling on the load-rolling surfaces of the slider bear against the rolling surfaces of the track rail within the straight region of the rail. Therefore, the ability of the slider to sustain a load is not impaired, unlike the case in which only some balls bear against the rolling surfaces in a curved region. If large loads act on the slider, the loads can be sufficiently sustained.

In the present invention, as long as the ball-rolling surfaces on the track rail side are formed on the surfaces of the rail, balls forming a row and rolling on the load-rolling surface of the slider do not simultaneously touch the arc-shaped rolling surface on the rail side. Therefore, this rolling surface may be shaped in the same way as the rolling surface of the prior art curved guide device without needing any special machining operation. Furthermore, this track rail can be easily fabricated, because one surface of the rail and the arc-shaped rolling surface formed on it can be simultaneously ground. However, where an upward facing rolling surface is formed on the top surface of a track rail, this rolling surface needs to be machined in a special manner. In particular, a downward facing load-rolling surface is linearly formed on the slider in an opposite orientation to the upward facing rolling surface of the track rail. Consequently, this upward facing rolling surface needs to have such a width that balls forming a row and rolling on the downward facing rolling surface of the slider simultaneously touch the upward facing surface.

In the universal guide device in accordance with the present invention, the slider can move through both straight and curved regions of the track rail freely. Therefore, if this rail is composed of only curved regions, the slider can move along th e annular rail. That is, where attention is paid to only the curved region of the rail, the universal guide device in accordance with the invention can be regarded as a curved guide device.

As mentioned previously, in the universal guide device in accordance with th e present invention, the straight and curved regions of the track rail differ in width. Therefore, it is desired to provide an intermediate rail portion connecting the straight and curved regions of the rail such that the width of the rail varies continuously in this intermediate rail portion.

Moreover, a moving table device can be built using universal guide devices of the construction in accordance with the invention as described above. Specifically, plural track rails are mounted parallel to each other on a fixed portion such as a pedestal or a base. A table is mounted to span sliders that move on these rails. However, if two or more sliders are mounted to each rail, and if all of the sliders are directly mounted to the same table, it will be difficult to move the table smoothly between the straight and curved regions of the rail, as mentioned previously.

In view of this, first and second track rails are mounted parallel to each other. Plural sliders are mounted to each of these rails. A fixed plate is made to span one slider mounted to the first rail and one slider mounted to the second rail such that these two sliders are coupled. Another fixed plate is bridged across another slider mounted to the first rail and another slider mounted to the second rail, and so on. Preferably, the table is mounted so as to be rotatable relative to the fixed plates. Where the moving table device is constructed in this way, even if the table is supported by the sliders that are four in number, the first fixed plate bridged over the first row of sliders that is the forerunner in the direction of movement and the second fixed plate bridged over the second row of sliders rotate in such a way that the sliders are oriented in the tangential direction of the rails. The distance between the sliders on the rails is made variable. Hence, the sliders can move smoothly.

Additionally, the table can be smoothly moved between the straight and curved regions of the rail by mounting the first and second rails parallel to each other, mounting plural sliders to each of the rails, and mounting the table so as to be rotatable relative to the sliders. That is, in this structure, when the sliders move through the curved region of the rail, they rotate to arbitrary directions so as to orient themselves to the tangential direction of the rails. This permits smooth movement of the sliders.

As described thus far, in the universal guide device in accordance with the present invention, the load-rolling surfaces formed on the sliders are only required to be shaped linearly rather than into an arc. Therefore, the sliders of numerous linear guide devices available on the market can be used intact. Moreover, it is not necessary to machine the load-rolling surfaces in conformity with the curvature of the rails. In consequence, the sliders can be manufactured easily and inexpensively.

Since the load-rolling surfaces formed on the sliders have no directivity, if each track rail has two curved regions bent in different directions, the sliders can move through the curved regions continuously along the rail. For example, materials can be guided freely along a track having a high degree of freedom (e.g., consisting of a combination of straight lines and curved lines such as an S-shaped track).

Because the load-rolling surfaces formed on the sliders are linear, all the balls rolling on the load-rolling surfaces of the sliders bear against the rail in the straight regions and sustain the load. Therefore, the sliders can exhibit sufficient ability to sustain the load within these straight regions. If straight and curved lines are intermingled on the rail, the sliders can move through the straight and curved regions continuously without sacrificing the ability of the rail in the straight regions to sustain the load.

Other objects and features of the invention will appear in the course of the description thereof, which follows.

BRIEF DESCRIPTION OF THE DRAWINGS

FIG. 11 is a fragmentary plan view of an intermediate rail portion in accordance with the first embodiment of the invention;

FIG. 20 is a plan view of this moving table device, showing the manner in which a table is moved;

FIG. 21 is a plan view of a fragmentary plan view of a moving table device built forming a fourth embodiment of the invention and using a universal guide device in accordance with the invention;

FIG. 22 is a diagram illustrating the disposition of the slider of the moving table device shown in FIG. 21 in a curved region;

DETAILED DESCRIPTION OF THE PREFERRED EMBODIMENTS

Figure 1:
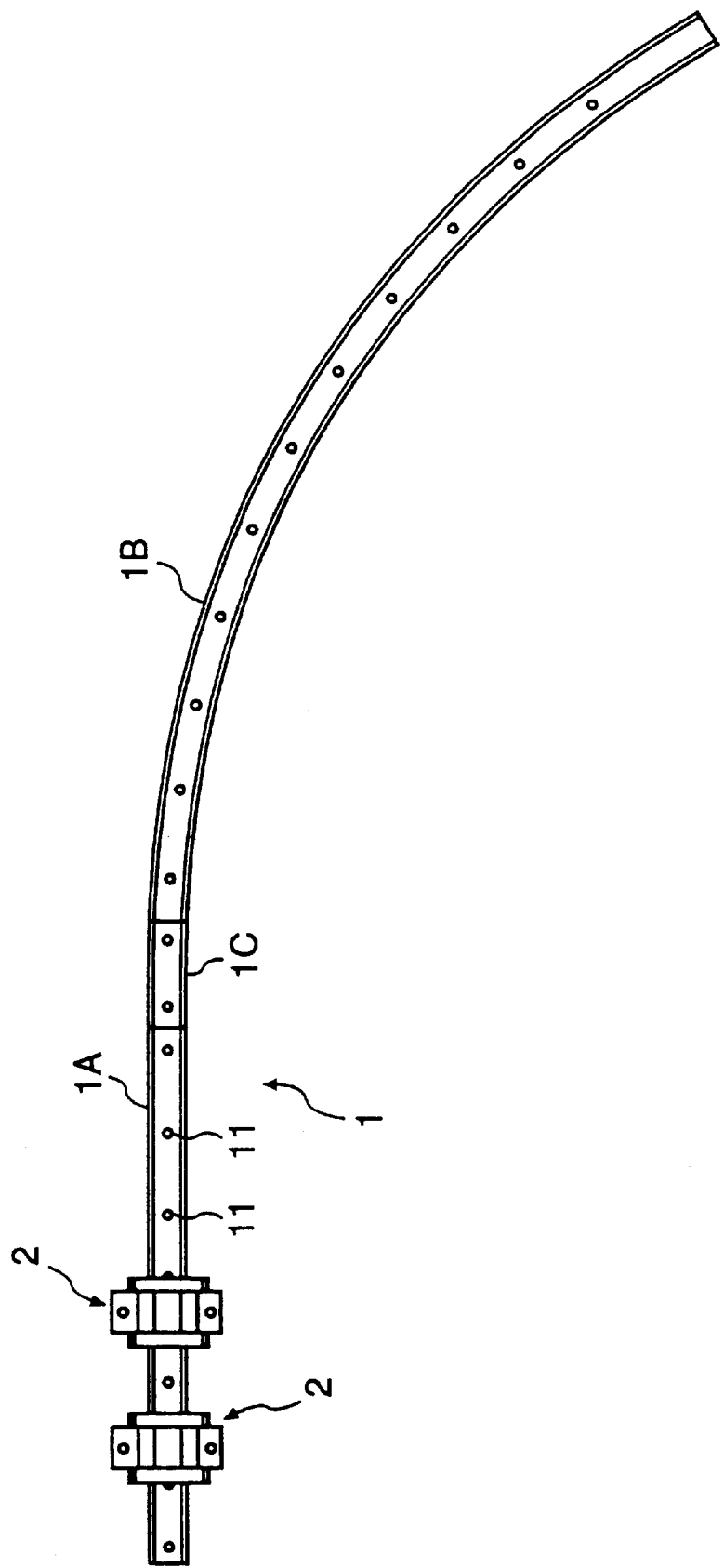
FIG. 1 is a plan view of a universal guide device in accordance with a first embodiment of the present invention.

Referring to FIG. 1, there is shown a universal guide device in accordance with a first embodiment of the present invention. A track rail 1 is mounted to a fixed portion such as a pedestal or a base. Sliders 2 can move along the rail 1. This rail 1 is composed of a straight guide rail portion 1A, a curved guide rail portion 1B shaped into an arc with a given radius, and an intermediate rail portion 1C connecting these rail portions 1A and 1B. The sliders 2 can move on these rail portions 1A, 1B, and 1C freely.

Figure 2:
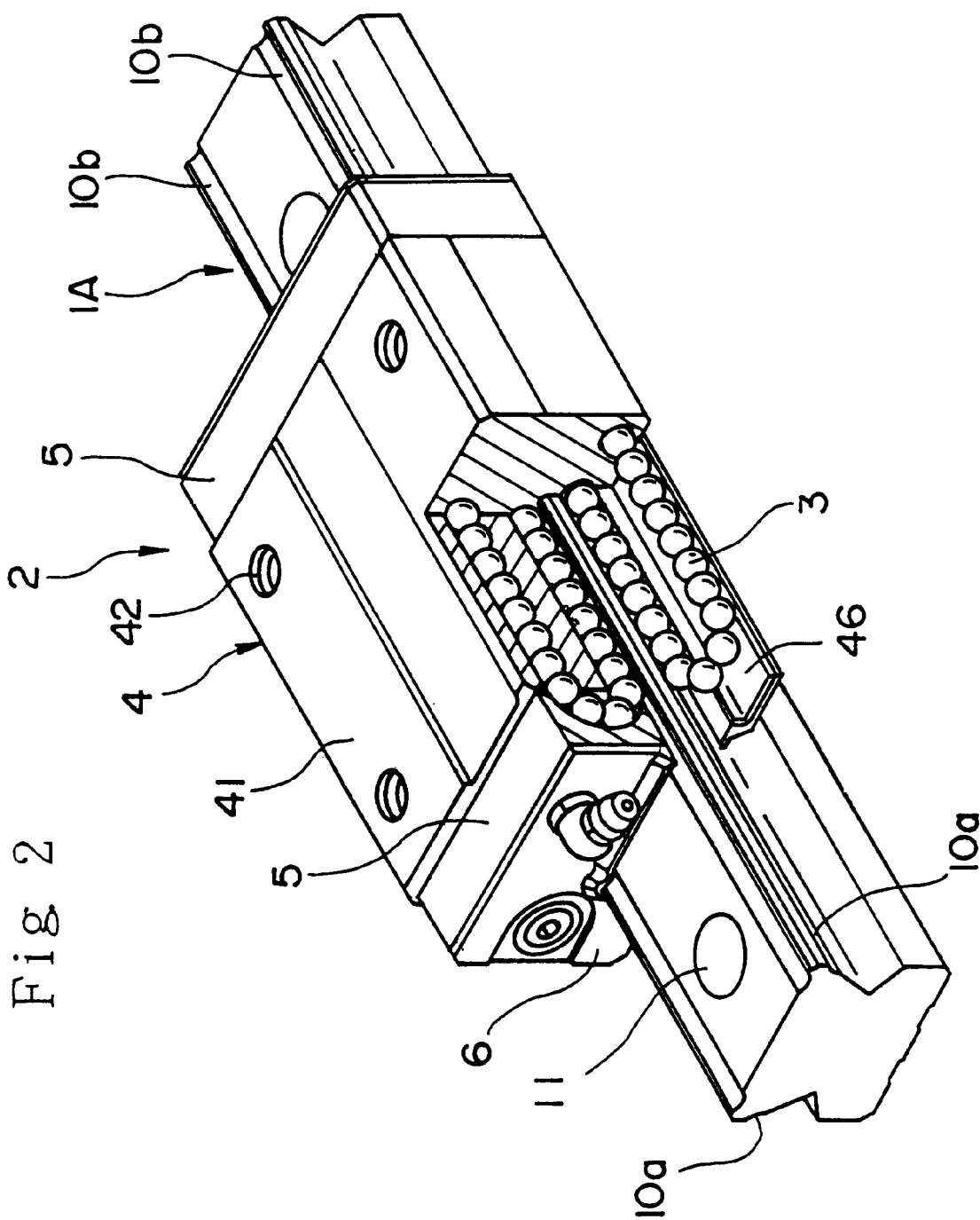
FIG. 2 is a perspective view of one slider and the straight guide rail portion shown in FIG. 1.
Figure 3:
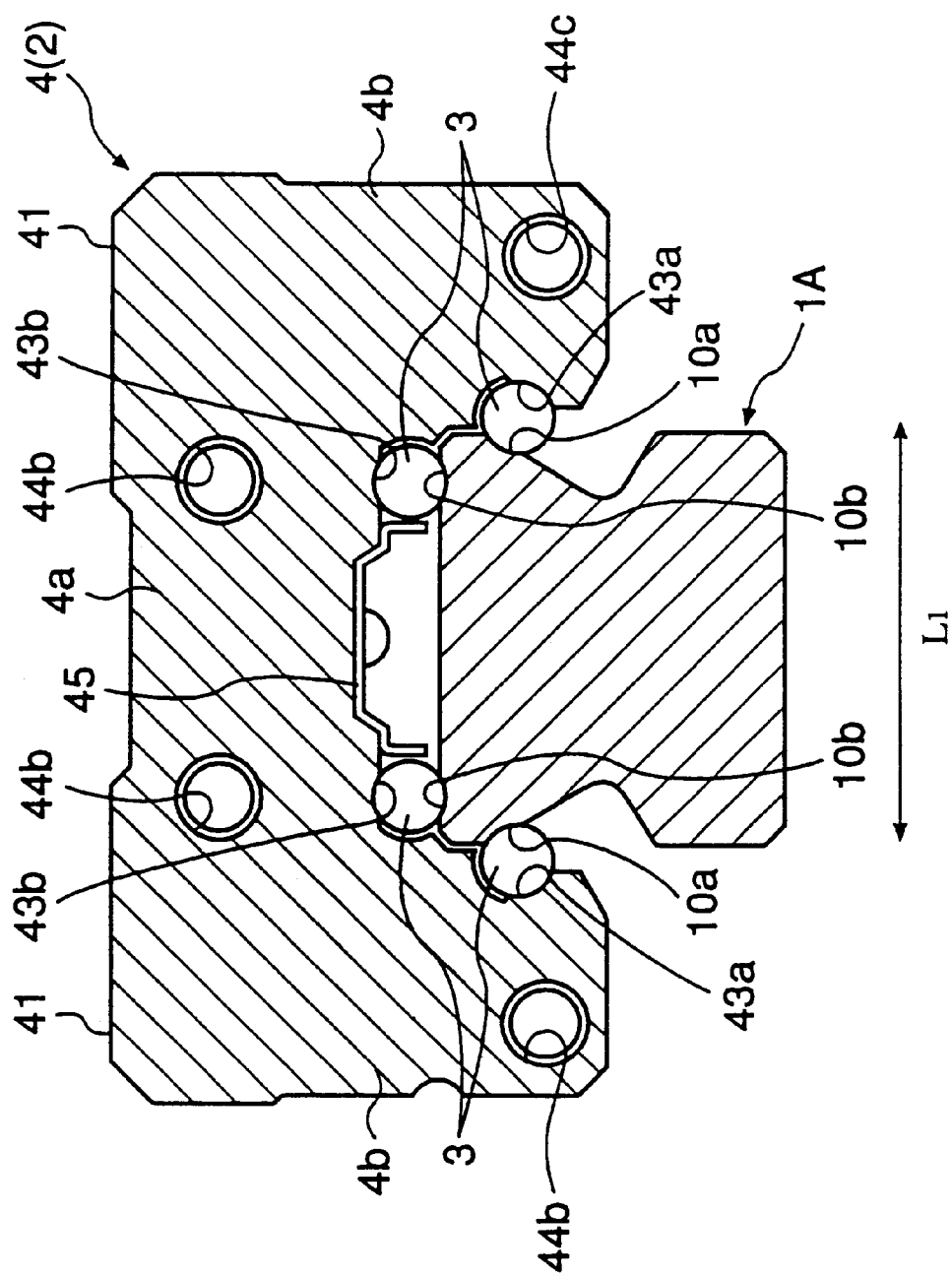
FIG. 3 is a front elevation in cross section of the slider and straight guide rail portion shown in FIG. 2, and in which the slider is mounted on the rail.

FIG. 2 is a perspective view of the straight guide rail portion 1A and one slider 2 mounted on this rail portion 1A. FIG. 3 is a front view in cross section taken axially of the straight guide rail portion 1A. The straight rail portion 1A has a substantially rectangular cross section. Two side ball-rolling surfaces 10a and two top ball-rolling surfaces 10b extend longitudinally. Balls 3 roll on these four rolling surfaces 10a, 10b. The two side ball-rolling surfaces 10a are formed on the opposite side surfaces of the straight guide rail portion 1A, while the two top ball-rolling surfaces 10b are formed around the opposite edges, respectively, of the top surface of the guide rail portion 1A. The side ball-rolling surfaces 10a are tilted at an angle of 30° downwardly from the horizontal in the paper. The top ball-rolling surfaces 10b face vertically upward. Bolt-mounting holes 11 are formed in the straight guide rail portion 1A and spaced regularly from each other longitudinally along the rail portion 1A. Anchoring bolts (not shown) are inserted in the bolt-mounting holes 11 to mount the rail portion 1A fixedly to the fixed portion.

Referring particularly to FIGS. 2 and 3, each of the sliders 2 described above comprises a movable block 4 and two covers 5 mounted to the front and rear end surfaces, respectively, of the block 4. The movable block 4 is provided with tapped holes 42 into which the anchoring bolts are screwed. The movable block 4 has a mounting surface 41 on which a movable body such as a table is mounted. An endless circular path for the balls 3 is formed inside the slider by mounting the covers 5 to the movable block 4. Seal members 6 that make a sliding contact with the track rail 1 are mounted to the covers 5, respectively, to prevent dust adhering to the rail 1 from entering the slider 2 during movement of the slider.

Referring particularly to FIG. 3, the aforementioned movable block 4 has a horizontal portion 4a and a pair of skirt portions 4b descending from the horizontal portion 4a. The block 4 has a saddlelike cross section. The above-described mounting portion 41 is formed in the horizontal portion 4a. Two straight load-rolling surfaces 43a are formed on the inner surfaces of the skirt portions 4b of the horizontal portion 4a and located opposite to side ball-rolling surfaces 10a of the straight guide rail portion 1A. Two straight load-rolling surfaces 43b are formed on the bottom surface of the horizontal portion 4a and located opposite to the top ball-rolling surfaces 10b of the straight guide rail portion 1A. Ball return holes 44a corresponding to the load-rolling surfaces 43a are formed in the skirt portions 4b, respectively. Ball return holes 44b corresponding to the load-rolling surfaces 43b are formed in the horizontal portion 4a. U-shaped direction change paths 51 (FIG. 4) are formed in the covers 5, respectively, to connect the load-rolling surfaces 43a and 43b with the ball return holes 44a and 44b, respectively, thus forming an endless circular path for balls.

Some of the balls 3 sustain a load between the ball-rolling surface 10a of the straight guide rail portion 1A and the load-rolling surface 43a of the movable block 4. The other balls 3 sustain a load between the top ball-rolling surface 10b of the straight guide rail portion 1A and the load-rolling surface 43b of the movable block 4. As each slider 2 moves, the balls 3 finish rolling over the load-rolling surfaces 43a and 43b. Then, the balls 3 are relieved of the load and enter the direction change path 51 in one cover 5. The balls then roll through the ball return holes 44a and 44b in the movable block 4 in a direction opposite to the direction of rolling motion on the load-rolling surfaces 43a and 43b while maintained in an unloaded state. After finishing rolling through the ball return holes 44a and 44b, the balls 3 enter again into the gap between the straight guide rail 1A and the movable block 4 through the direction change path 51 in the other cover 5, and roll on the load-rolling surfaces 43a and 43b while sustaining a load.

Ball-holding plates 45 and 46 are mounted to the bottom ends of the skirt portions 4b and the horizontal portion 4a, respectively, of the movable block 4. The ball-holding plates 45 and 46 are stamped from a metal plate or formed from a hard synthetic resin by injection molding or other method. The ball-holding plates 45 and 46 prevent the balls 3 rolling on the ball-rolling surfaces 10a, 10b from coming off the slider 2 when the slider 2 is removed from the track rail 1.

Figure 4:
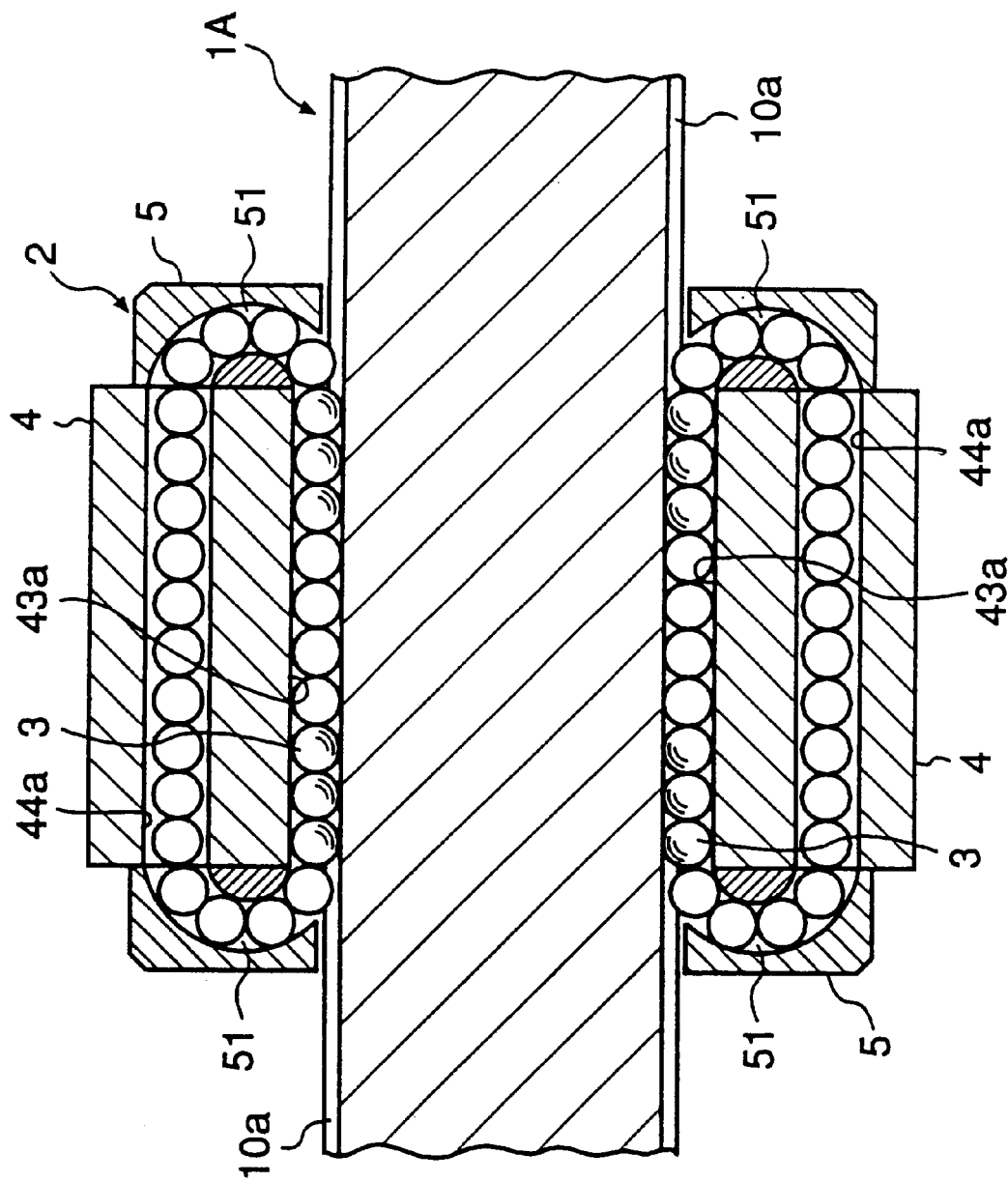
FIG. 4 is a plan view in cross section of the slider and straight guide rail shown in FIGS. 2 and 3, showing the manner in which balls are rolling and circulating through a circular path when the slider is moving along the rail.

FIG. 4 shows the manner in which the balls 3 are rolling on the side rolling surfaces 10a formed on the side surfaces of the straight guide rail portion 1A and circulating through the path when each slider 2 is moving along the straight guide rail portion 1A. The balls 3 rolling on the top ball-rolling surfaces 10b formed on the top surface of the straight guide rail portion 1A make similar rolling and circulating motion.

As mentioned previously, the direction change paths 51 corresponding to the load-rolling surfaces 43a and 43b are formed in the two covers 5 mounted to the opposite end surfaces, respectively, of the movable block 4. By mounting the covers 5 to the movable block 4, the slider 2 forms an endless circular path for the balls 3 as shown. The rolling surfaces 10a and 10b extend linearly and longitudinally along the straight guide rail portion 1A. Also, the load-rolling surfaces 43a and 43b of the slider 2 opposite to the rolling surfaces 10a and 10b, respectively, are formed linearly. Therefore, all the balls 3 simultaneously rolling on the load-rolling surfaces 43a and 43b are in contact with the rolling surfaces 10a and 10b, respectively, of the straight guide rail portion 1A, as shown in FIG. 4. That is, when the slider 2 is moving along the straight guide rail portion 1A, none of the balls 3 are idling without sustaining a load between the rolling surface 10a or 10b on the side of the track rail 1 and the load-rolling surface 43a or 43b on the side of the slider 4. If a large load is applied to the slider 2, the load is sustained reliably, and the slider 2 can be moved smoothly.

Figure 5:
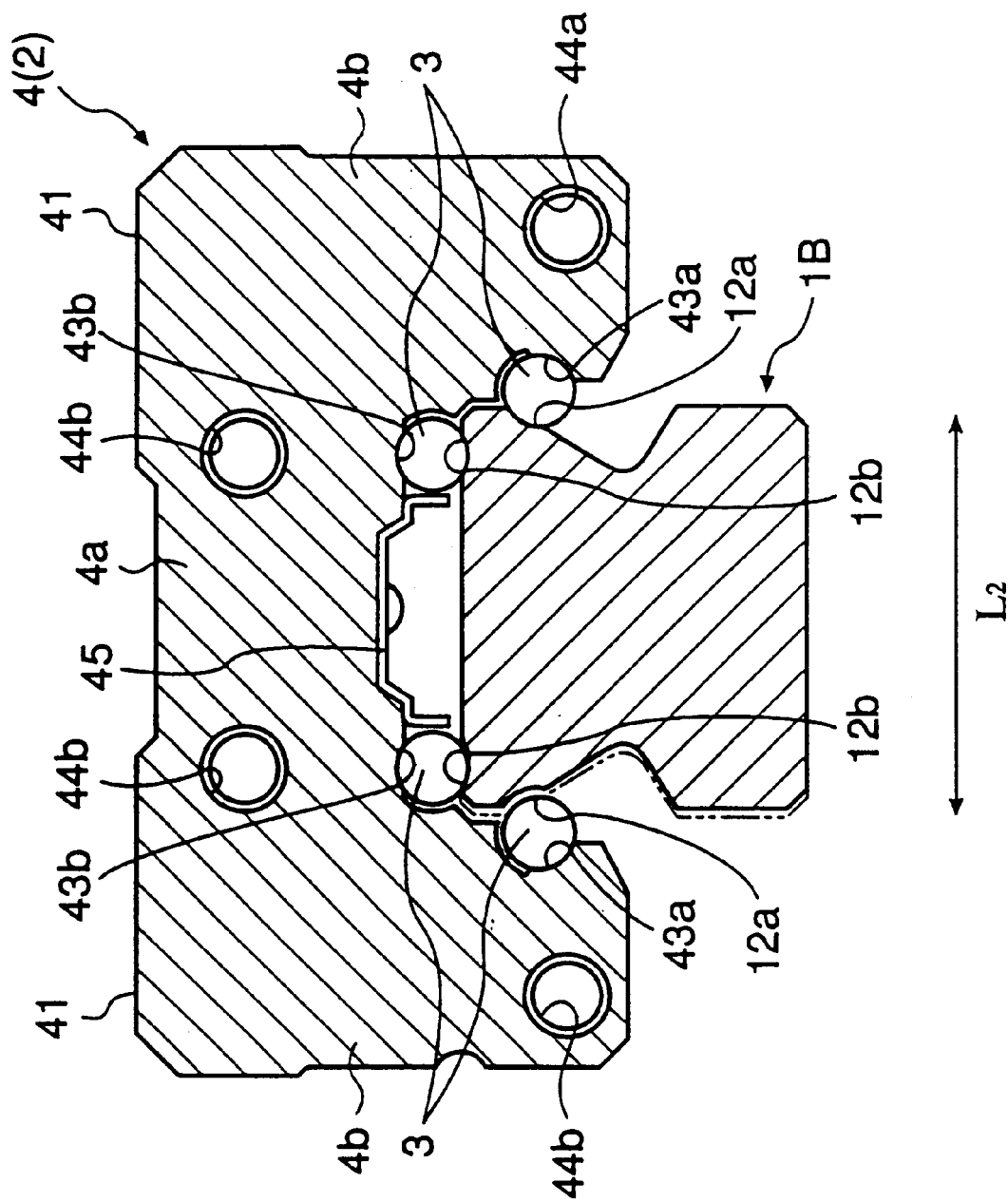
FIG. 5 is a front elevation in cross section similar to FIG. 3, but in which the slider is mounted on a curved guide rail portion.

FIG. 5 is a front view in cross section of the curved guide rail portion 1B and one slider 2 mounted on it. This curved guide rail portion 1B is shaped into a cross-sectional shape similar to that of the above-described straight guide rail portion. This curved guide rail portion 1B is shaped into an arc having a given curvature R in the longitudinal direction. Side rolling surfaces 12a continuous with the side rolling surfaces 10a, respectively, formed on the opposite side surfaces of the straight guide rail portion 1A are formed on the opposite side surfaces of the curved guide rail portion 1B. Top rolling surfaces 12b continuous with the top rolling surfaces 10b, respectively, formed on the top surface of the straight guide rail portion 1A are formed on the top surface of the curved guide rail portion 1B.

Figure 16:
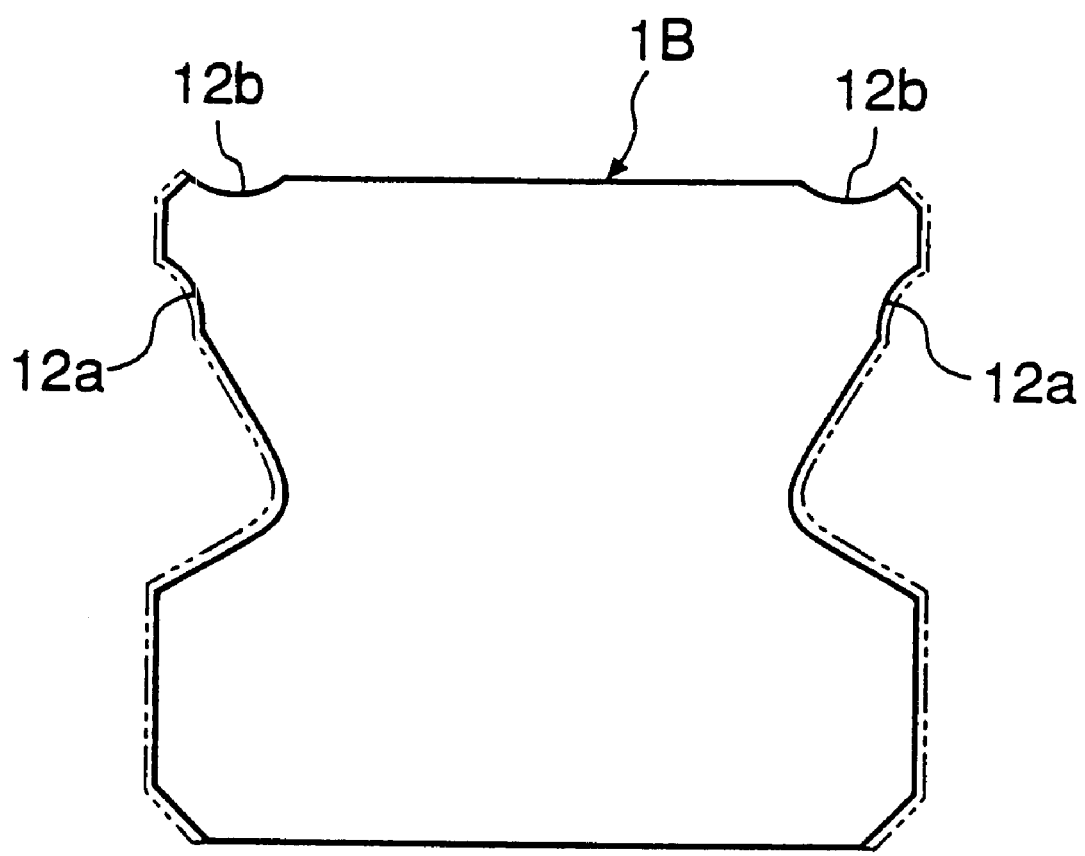
FIG. 16 is a cross-sectional view of the curved guide rail portion shown in FIGS. 14 and 15, but in which the rail portion has been ground at both side surfaces and finished to a given width.

Since the curved guide rail portion 1B is formed to have a given curvature, if the width $L_2$ of the curved guide rail portion 1B is set equal to the width $L_1$ of the straight guide rail portion 1A, then the inner side surface of the curved guide rail portion 1B may be hindered by the skirt portions 4b or with the covers 5. Therefore, the width $L_2$ of the curved guide rail portion 1B is set smaller than the width $L_1$ of the straight guide rail portion 1A. For comparison, the cross section of the straight guide rail portion 1A is indicated by the dot-and-dash line. When the width $L_2$ of the curved guide rail portion 1B is set smaller than the width $L_1$ of the straight guide rail portion 1A, only the inner side surface of the curved guide rail portion 1B needs to be ground, as shown in FIG. 5. Alternatively, both inner and outer side surfaces may be ground, as shown in FIG. 16.

Figure 6:
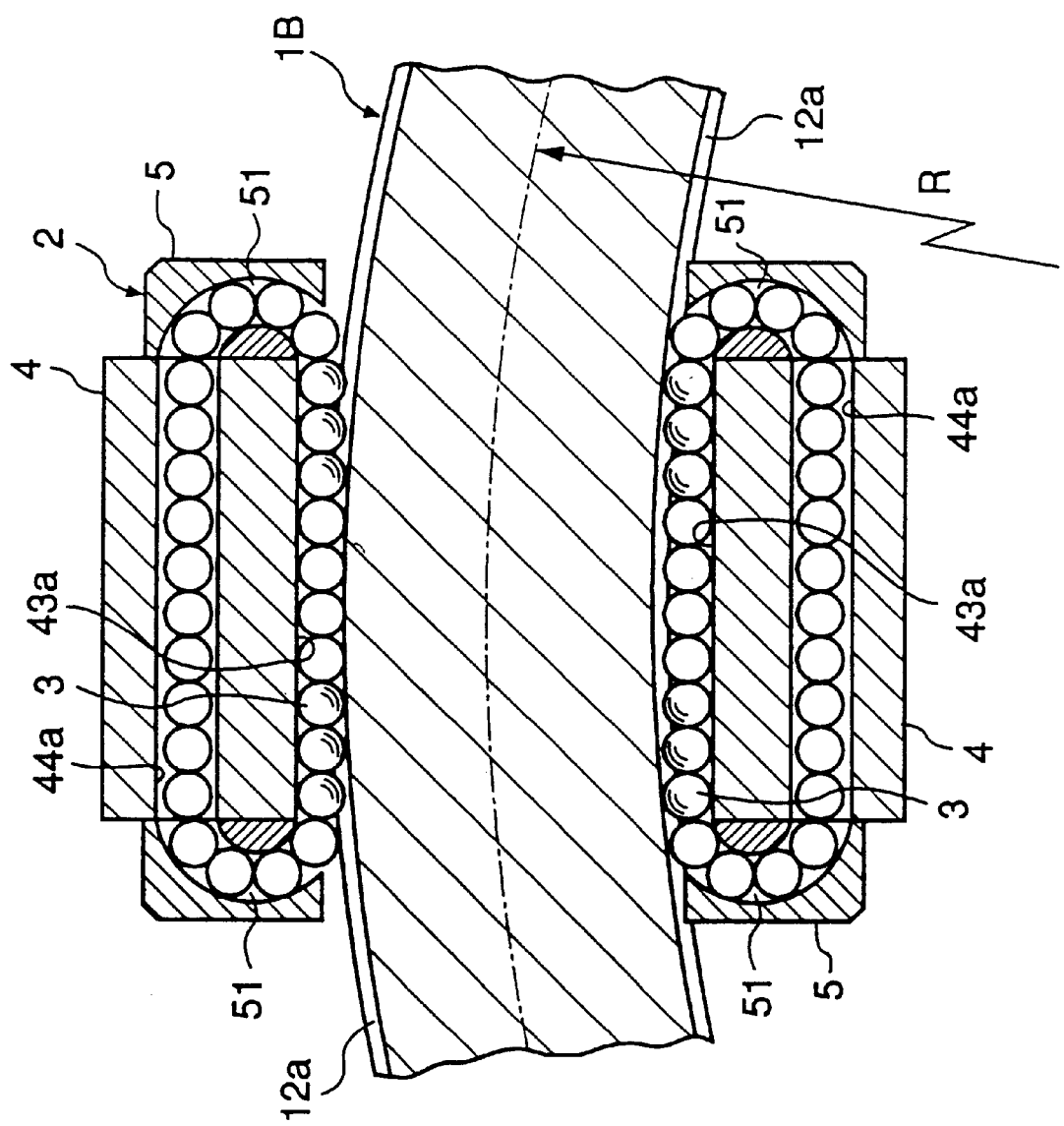
FIG. 6 is a plan view in cross section of the slider and curved guide rail portion shown in FIG. 5, showing the manner in which balls are rolling through circular paths when the slider is moving along the rail.

FIG. 6 shows the manner in which the balls 3 are rolling and circulating through a circular path when the slider 2 is moving along the curved guide rail portion 1B. The balls 3 are shown to roll on the rolling surfaces 12a formed on the opposite side surfaces of the curved guide rail portion 1B. The rolling surfaces 12a are shaped into arcs longitudinally of the curved guide rail portion 1B. On the other hand, the load-rolling surfaces 43a of the slider 2 opposite to the rolling surfaces 12a are shaped linearly. Thus, as shown in FIG. 6, inside of the curved guide rail portion 1B, only those of the balls 3 which are rolling close to both ends of the load-rolling surfaces 43a bear against the rolling surfaces 12a. Outside of the curved guide rail portion 1B, only those of the balls 3 which roll across the centers of the load-rolling surfaces 43a bear against the rolling surfaces 12a. That is, when the slider 2 is moving along the curved guide rail portion 1B, only parts of the balls 3 rolling on the load-rolling surfaces 43a of the slider 2 sustain a load, whereas the other balls 3 idle without sustaining a load. It may be considered that all the balls 3 rolling on the load-rolling surfaces 43a bear against the rolling surfaces 12a of the curved guide rail portion 1B, depending on the curvature of the curved guide rail portion 1B. Even in this case, some of the balls 3 hardly sustain a load and idle. Even if some of the balls 3 idle without bearing against the rolling surfaces 12a of the curved guide rail portion 1B in this way, these balls 3 do not disengage from between the load-rolling surfaces 43a and the rolling surfaces 12, because the ball-holding plate 46 is mounted to the slider 2.

Figure 7:
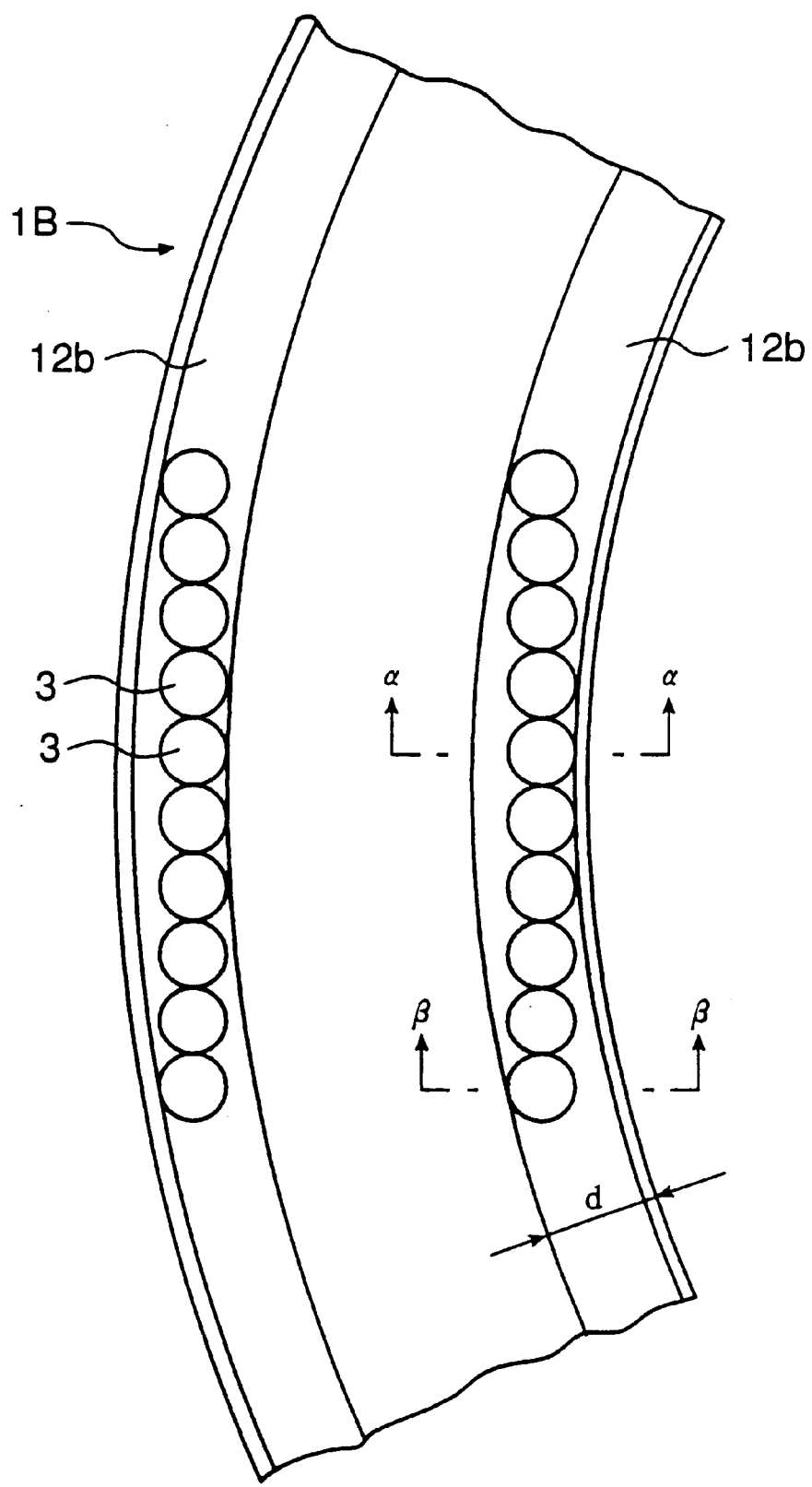
FIG. 7 is a fragmentary plan view of a rolling surface formed on the top surface of a curved guide rail portion, showing the manner in which balls are rolling on the rolling surface.

FIG. 7 shows the manner in which the balls 3 are rolling on the load-rolling surfaces 43b formed on the horizontal portion 4a of the slider 2. That is, FIG. 7 is a perspective of the slider 2 as taken from above the curved guide rail portion 1B. Since the load-rolling surface 43b of the slider 2 is straight while the opposite rolling surface 12b of the curved guide rail portion 1B is shaped into an arc, if the width of the rolling surfaces 12b is set equal to the width of the side rolling surfaces 12a on the curved guide rail portion and the width of the load-rolling surfaces 43b, some of the balls 3 rolling on the load-rolling surface 43b on the side of the slider 2 bear against the inner surface of the rolling surface 12b. The others come off the rolling surface 12b and bear against the top surface of the curved guide rail portion 1B. Consequently, the balls 3 cannot smoothly circulate through the endless circular path in the slider 2.

Figure 8:
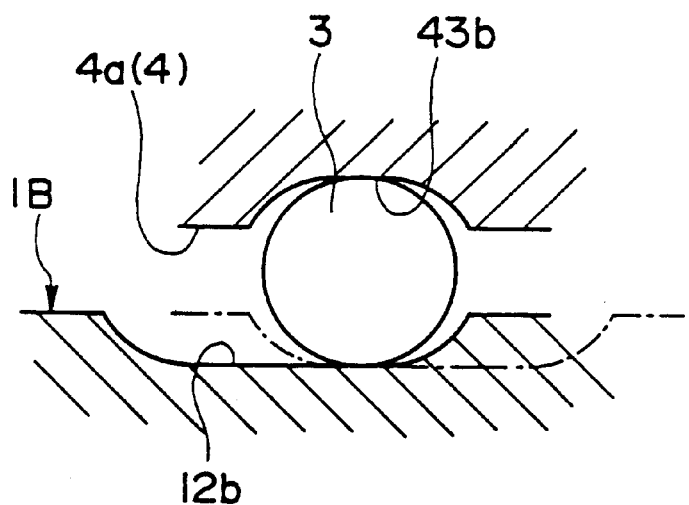
FIG. 8 is an enlarged cross section of a rolling surface formed on the top surface of a curved guide rail portion and a load-rolling surface of a slider, showing the manner in which balls are rolling between the rolling surface on the rail and the load-rolling surface of the slider.

Therefore, the rolling surface 12b formed on the top surface of the curved guide rail portion 1B is shaped to have a larger groove width d than the load-rolling surfaces 43b such that all the balls 3 which roll on the load-rolling surfaces 43b can simultaneously bear against the rolling surface 12b, as shown in FIG. 7. FIG. 8 is an enlarged view showing the manner in which the balls 3 touch rolling surfaces between the load-rolling surface 43b on the side of the slider 2 and the rolling surface 12b on the side of the curved guide rail portion 1B. The solid line indicates the manner in which the balls touch the rolling surfaces in cross section α—α of FIG. 7. The dot-and-dash line indicates the manner in which the balls touch the rolling surfaces in cross section β—β. The rolling surfaces 12b are set wider than the load-rolling surfaces 43b. Furthermore, the rolling surfaces 12b are shaped into an arc having a curvature in the horizontal direction in the plane of FIG. 8. Therefore, as the balls 3 roll on the straight load-rolling surfaces 43b, the positions at which the balls touch the rolling surfaces 12b move right and left. The balls roll on the load-rolling surfaces 43b while sustaining a load between the slider and the curved guide rail portion at all times.

In the universal guide device in the present invention in this way, the curved guide rail portion 1B is set narrower than the straight guide rail portion 1A. Where the top surface of the track rail 1 needs a rolling surface for the balls 3, only the rolling surface 12b on the top surface of the curved guide rail portion 1B is set wider than the load-rolling surface 43b on the side of the slider 2. Hence, the slider 2 can be moved freely between the straight guide rail portion 1A and the curved guide rail portion 1B, though the slider 2 is the same as the prior art linear guide device structure.

However, when the slider 2 moves along the curved guide rail portion 1B, the number of the balls 3 bearing against the side rolling surfaces 12a of the curved guide rail portion 1B is fewer than the number of the balls 3 bearing against the side rolling surfaces 10a of the straight guide rail portion 1A. Therefore, it cannot be denied that the ability of the slider 2 to sustain a load in the curved region of the track rail 1 decreases. However, the ability of the straight region to sustain a load is not sacrificed for the sake of the curved region. If a large load acts on the slider 2 in the straight region, the load can be sufficiently sustained.

Figure 9:
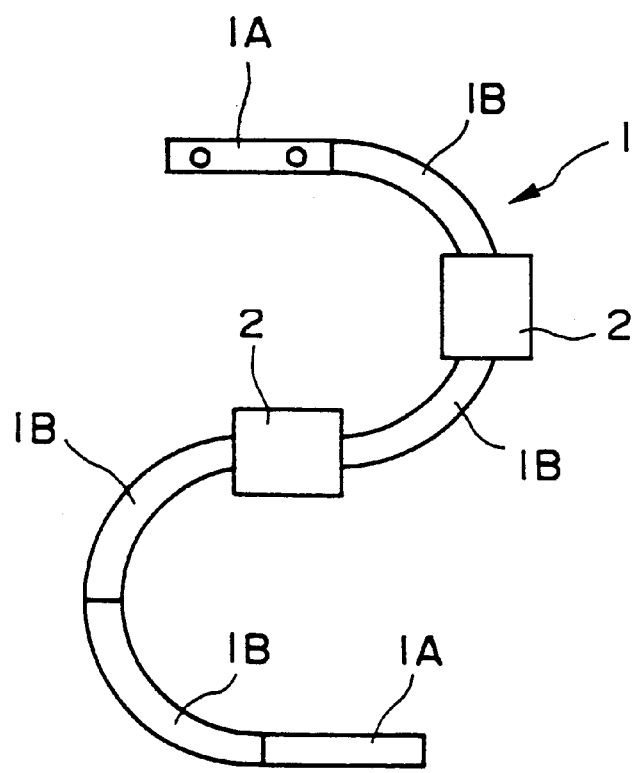
FIG. 9 is a plan view of a universal guide device that can be fabricated by making use of a combination of straight guide rail portions and curved guide rail portions in accordance with the first embodiment.

In the universal guide device in accordance with the present invention as described above, the load-rolling surfaces 43a and 43b of the slider 2 are shaped linearly and have no directivity. Therefore, the slider 2 can move along the curved guide rail portion 1B without trouble, irrespective of whether the curved guide rail portion 1B is bent right or left. For this reason, as shown in FIG. 9, the slider 2 can be moved along an S-shaped track rail 1 built by combining two curved guide rail portions 1B bent in different directions. Furthermore, it is not always necessary that all the successive curved guide rail portions 1B within the continuous track rail 1 be shaped into arcs with uniform radius. The slider can be moved freely even if curved rail portions having different radii are combined.

Figure 10A:
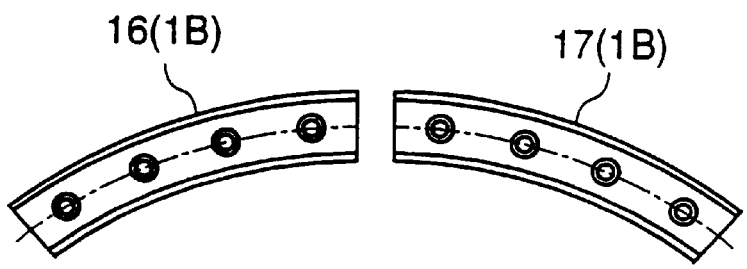
FIGS. 10(a)–10(c) are plan views of S-shaped rails each consisting of two split guide rail portions.
Figure 10B:
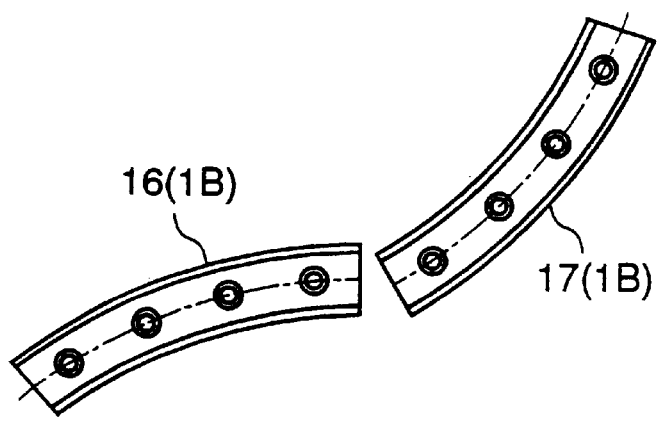
Figure 10C:
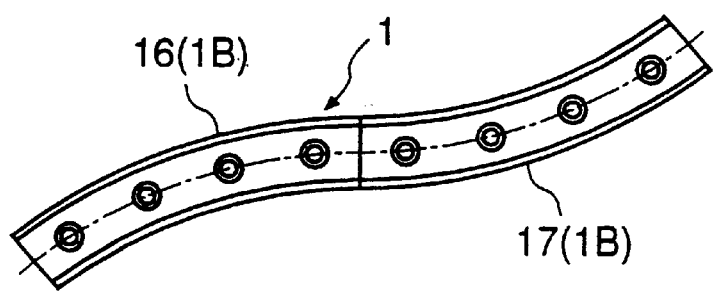

As shown in FIG. 10, the curved guide rail portion 1B formed at uniform curvature is cut into two rail pieces 16 and 17. Then, one rail piece 17 is rotated through 180° and combined with the other rail piece 16, thus forming an S-shaped track rail 1. Even in this case, the slider 2 can be moved along the track rail 1 freely.

Referring next to FIG. 11, there is shown the intermediate rail portion 1C connecting the straight guide rail portion 1A and the curved guide rail portion 1B. It may be possible to construct the track rail 1 by connecting the straight guide rail portion 1A and curved guide rail portion 1B without using the intermediate rail portion 1C. As mentioned previously, the curved guide rail portion 1B is set narrower than the straight guide rail portion 1A. In addition, the rolling surface 12b of the curved guide rail portion 1B is set wider than the top rolling surface 10b of the straight guide rail portion 1A. Therefore, if the straight guide rail portion 1A and curved guide rail portion 1B are connected directly, then smooth movement of the slider 2 may be somewhat hindered. Consequently, in the present invention, the intermediate rail portion 1C is interposed between the straight guide rail portion 1A and the curved guide rail portion 1B to transport the slider 2 from the straight guide rail portion 1A to the curved guide rail portion 1B and vice versa smoothly.

This intermediate rail portion 1C assumes a cross-sectional shape similar to that of the straight guide rail portion 1A, and extends linearly. The intermediate rail portion 1C has ball-rolling surfaces that continuously connect with the rolling surfaces 10a and 10b of the straight guide rail portion 1A and with the rolling surfaces 12a and 12b of the curved guide rail portion 1B. Since the curved guide rail portion 1B is set narrower than the straight guide rail portion 1A, the side surface 14 of the intermediate rail portion 1C that is continuous with the inner side surface of the curved guide rail portion 1B is cut out obliquely on the side at the end of the curved guide rail portion 1B as indicated by the dot-and-dash line of FIG. 13. The width decreases gradually from the straight guide rail portion 1A toward the curved guide rail portion 1B. Thus, the side rolling surface 10a formed on the side of the straight guide rail portion 1A is continuous with the rolling surface 12a formed on the side surface of the curved guide rail portion 1B, without step-wise changes. The balls can roll smoothly between the rolling surfaces 10a and 12a.

Figure 12:
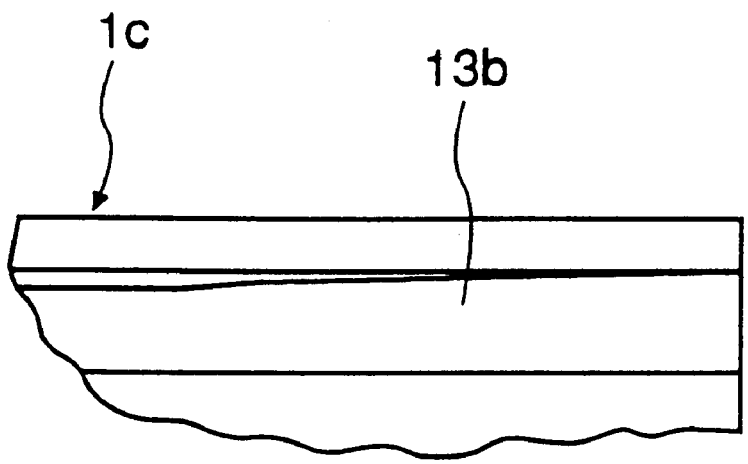
FIG. 12 is a fragmentary enlarged plan view of portion A of FIG. 11.
Figure 13:
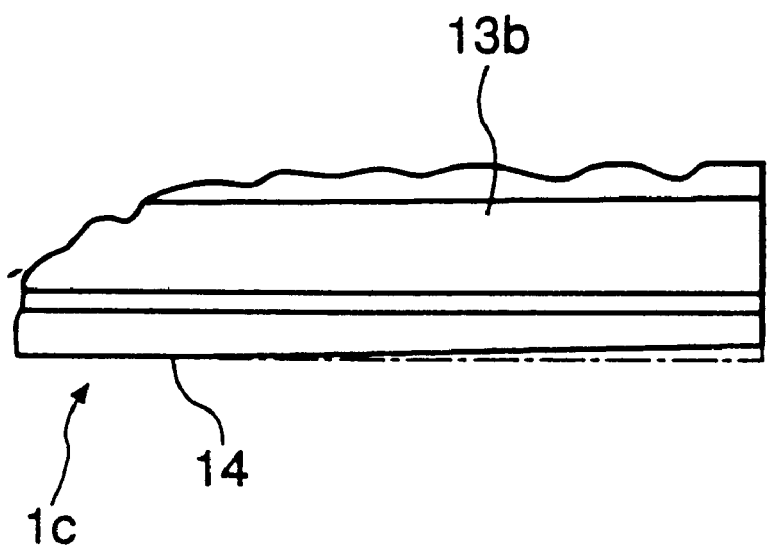
FIG. 13 is an enlarged plan view of portion B of FIG. 11.

As shown in FIG. 11, a ball-rolling surface 13b that is continuous with the rolling surface 10b of the straight guide rail portion 1A and with the rolling surface 12b of the curved guide rail portion 1B is formed on the top surface of the intermediate rail portion 1C. As shown in FIGS. 12 and 13, the width of the ball-rolling surface 13b gradually increases on the side at the end of the curved guide rail portion 1B. This connects the rolling surfaces 10b and 12b having different widths without any step-wise changes. Consequently, balls that have rolled on the rolling surface 12b of the curved guide rail portion roll into the top rolling surface 10b of the straight guide rail portion that is narrower than the rolling surface 12b without being caught. In this way, the slider can be smoothly moved from the curved region to the straight region of the track rail.

Figure 14:
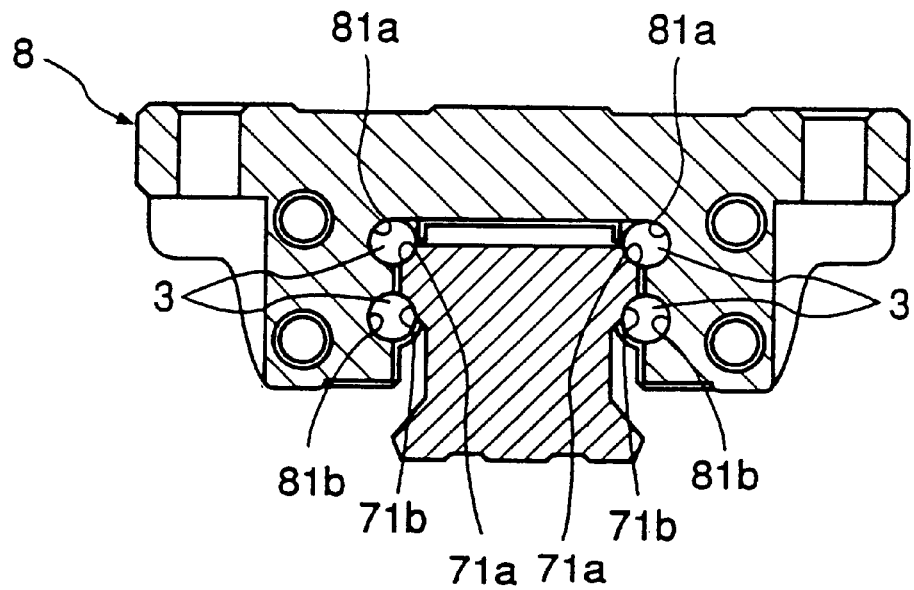
FIG. 14 is a front view in cross section of a universal guide device in accordance with a second embodiment of the invention.

Referring next to FIG. 14, there is shown a universal guide device in accordance with a second embodiment of the present invention. A track rail 7 and a slider 8 are similar in fundamental structure with their respective counterparts of the first embodiment described above. However, the rail 7 has two ball-rolling surfaces 71a and two ball rolling surfaces 71b on opposite sides, one pair above the other. The upper rolling surfaces 71a are tilted at an angle of 45° upwardly. The lower rolling surfaces 71b are tilted at an angle of 45° downwardly. The slider 8 has load-rolling surfaces 81a and 81b that are tilted at angles corresponding to the ball rolling surfaces 71a and 71b, respectively.

Figure 15:
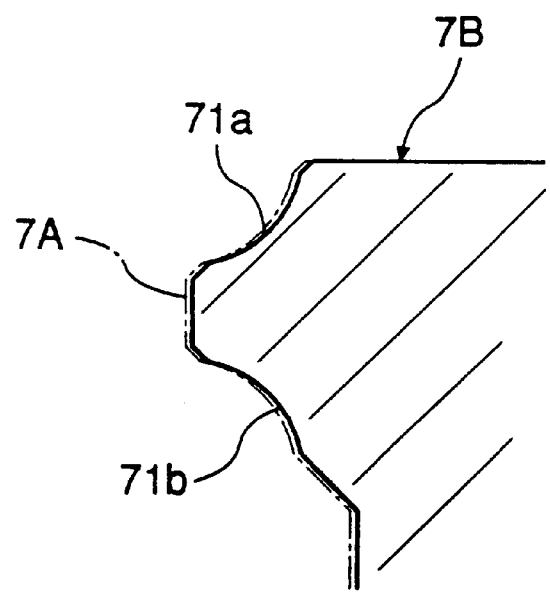
FIG. 15 is an enlarged cross section of main portions of the curved guide rail portions shown in FIG. 14.

This FIG. 14 shows the manner in which the slider 8 is mounted to the straight region of the track rail 7, i.e., the straight guide rail portion 7A. A curved guide rail portion 7B continuous with this straight guide rail portion 7A is set narrower than the straight guide rail portion 7A, in the same way as in the first embodiment. FIG. 15 is a front view in cross section of the curved guide rail portion 7B, and in which the contour of the straight guide rail portion 7A is also indicated by the dot-and-dash line.

In the universal guide device in accordance with the second embodiment constructed in this manner, the curved guide rail portion 7B is set narrower than the straight guide rail portion 7A in the same way as in the first embodiment. In consequence, the slider 8 can freely move between the straight guide rail portion 7A and the curved guide rail portion 7B.

In the embodiments given above, the present invention is applied to universal guide devices. If an annular track rail is composed by combining plural curved guide rail portions of the structure described above, the slider can be moved along this rail. A curved guide device can be easily constructed.

In the present invention, the load-rolling surfaces 43a and 43b formed on the slider 2 are shaped linearly. Therefore, a universal guide device can be fabricated by making direct use of sliders of the existing linear guide devices. Accordingly, in the embodiments described above, the curved guide rail portion 1B is set narrower than the straight guide rail portion 1A to permit the slider of the straight guide device to move along the curved guide rail portion 1B as it is. However, due to the degree of curvature of the curved guide rail portion 1B, it may be impossible to adapt the structure sufficiently only with a decrease in the width of the curved guide rail portion 1B. The curved guide rail portion 1B may be hindered in its movement by the skirt portions 4b of the slider 2 or with the covers 5. Accordingly, in this case, the length of the slider 2 taken longitudinally with regard to the track rail 1 is reduced, thus preventing interference between the curved guide rail portion 1B and the slider 2.

Figure 17:
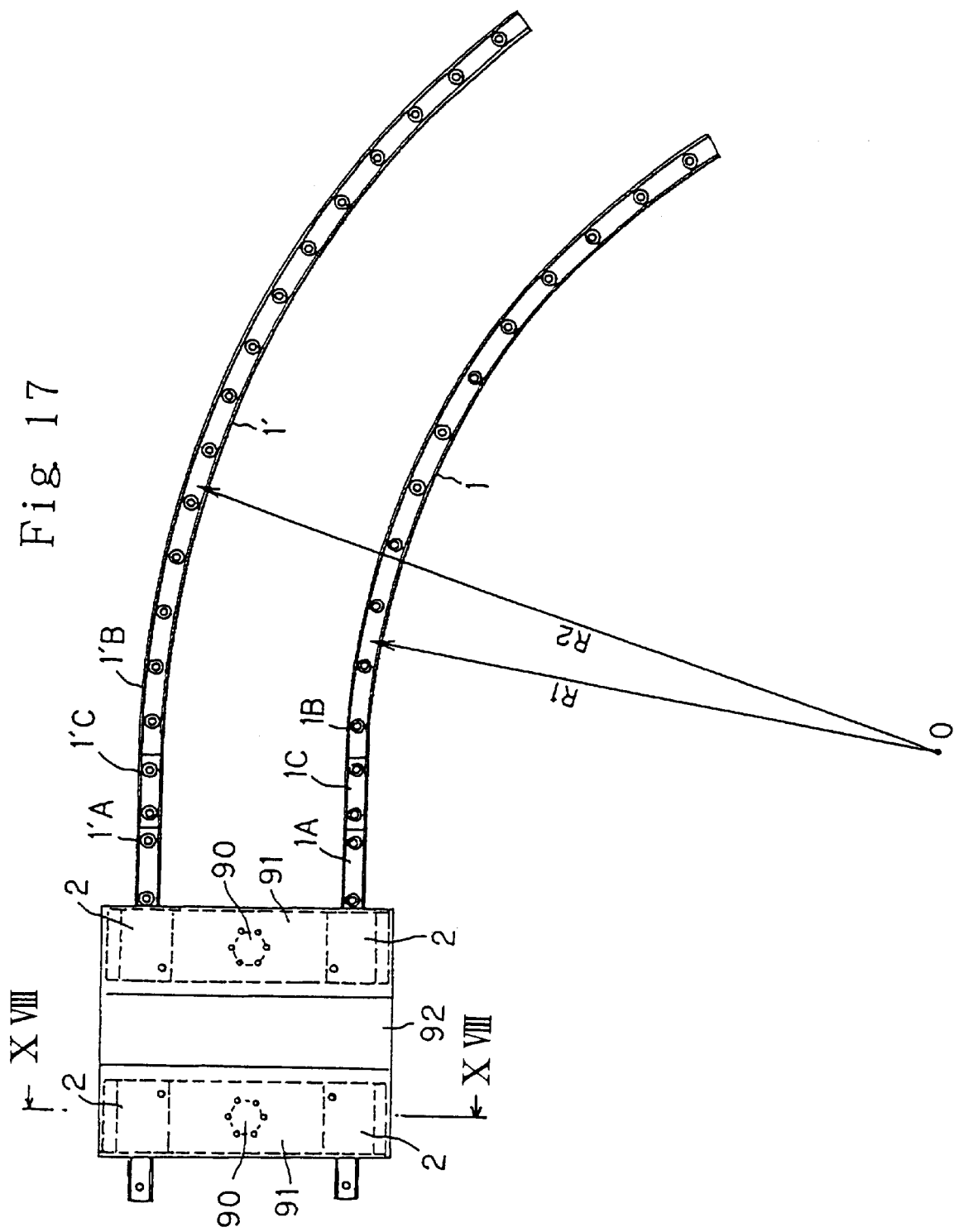
FIG. 17 is a fragmentary plan view of a moving table device forming a third embodiment of the invention, the moving table device using a universal guide device in accordance with the invention.
Figure 18:
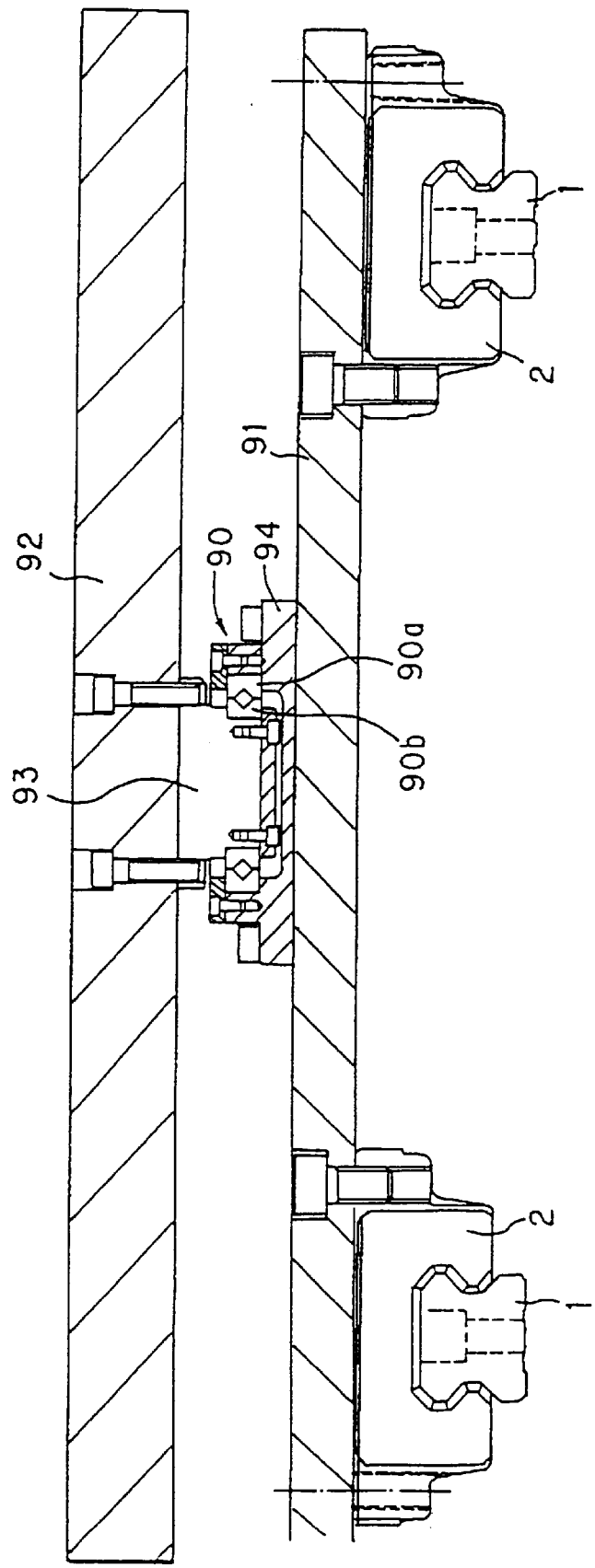
FIG. 18 is a cross-sectional view taken along line XVIII—XVIII of FIG. 17.

Referring to FIGS. 17 and 18, there is shown a moving table device using a universal guide device in accordance with the present invention, the moving table device forming a third embodiment of the invention. Track rails 1 and 1' are mounted to a fixed portion such as a pedestal or a base. Sliders 2 can move along the rails 1 and 1'. A table 92 is mounted to the sliders.

The track rails 1 and 1' are composed of the first rail 1 and the second rail 1' that extend in parallel and are uniformly spaced from each other. The rail 1 comprises a straight guide rail portion 1A, a curved guide rail portion 1B shaped into an arc with a given curvature, and an intermediate rail portion 1C connecting the straight guide rail portion 1A and the curved guide rail portion 1B. Similarly, the rail 1' comprises a straight guide rail portion 1'A, a curved guide rail portion 1'B shaped into an arc with a given curvature, and an intermediate rail portion 1'C connecting the straight guide rail portion 1'A and the curved guide rail portion 1'B. The radii of curvature of the curved guide rail portions 1B and 1'B are set to R1 and R2, respectively. The centers O of their radii of curvature are coincident.

Plural (e.g., 2) sliders 2 are mounted to each of the rails 1 and 1'. Four sliders in total support the table. The sliders 2 can move freely on the first rail 1 (1A, 1B, 1C) and on the second rail 1' (1'A, 1'B, 1'C). A pair of fixed plates 91 is mounted across the first and second rows of the sliders 2 as viewed in the direction of motion on the rails 1 and 1'. The fixed plates 91 assume an elongated rectangular form and are mounted to the top surfaces of the sliders 2 with fixing means such as screws. That is, the fixed plates 91 are bridged across the sliders 2 that are adjacent to each other looking down the longitudinal direction of the rails 1 and 1' (i.e., in the direction of the array of the rail portions).

The table 92 is mounted so as to be rotatable relative to the fixed plates. A shaft 93 is mounted to the bottom surface of the table 92. Rotary bearings 90 for rotatably holding the shaft 93 are mounted to the top surfaces of the fixed plates 91. The rotary bearings 90 permit the table 92 to rotate relative to the fixed plates while the bearings receive a load from the table 92. The rotary bearings 90 are mounted in housings 94, which in turn are mounted to the fixed plates 91. Each of the rotary bearings 90 has an outer race 90a mounted to the housing and an inner race 90b mounted to the shaft 93.

Figure 19:
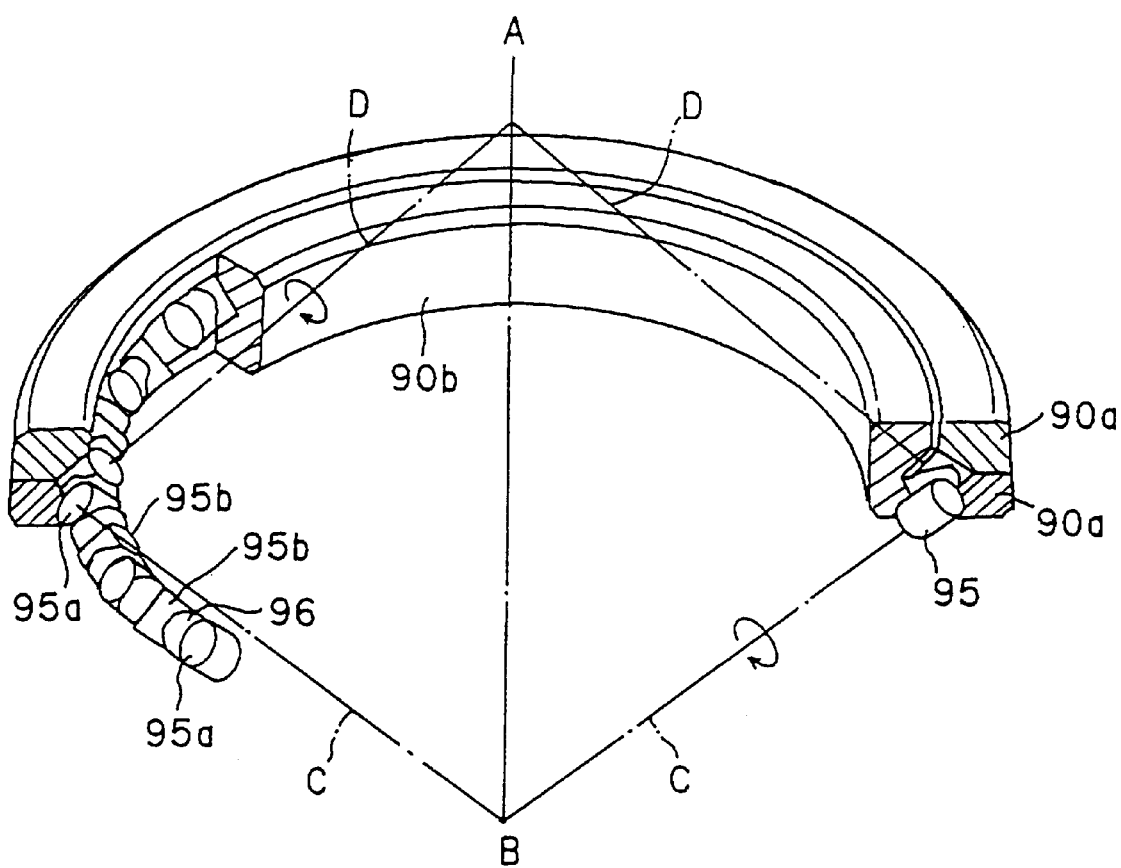
FIG. 19 is a perspective view of a rotary bearing used for the moving table device shown in FIGS. 17 and 18.

FIG. 19 shows one of the rotary bearings 90. A V-shaped rolling surface is formed in both the outer race 90a and inner race 90b. A roller-rolling path of substantially rectangular cross section is formed between these rolling surfaces. Plural rollers 95 are arranged in the roller-rolling path and tilted alternately in directions at right angles to each other. The rollers 95 roll in the roller-rolling path while receiving a load. Spacers 96 are interposed between adjacent rollers 95 to maintain the rollers 95 in a given disposition.

In the roller-rolling path, the two rollers 95 horizontally adjacent to the same spacer 96 have axes that are perpendicular to each other. These rollers 95 are classified as outward facing rollers 95a and inward facing rollers 95b. The spacers 96 maintain the outward facing rollers 95a in such a disposition that their axes C face toward the center of rotation B lying at the center of rotation of the outer race 90a and the inner race 90b.

FIG. 20 shows the manner in which the track rails 1 and 1' consisting of the rail portions 1A, 1B, 1C and rail portions 1'A, 1'B, 1'C, respectively, are combined into an S-shaped form. The fixed plates 91 and the table 92 move on this S-shaped rail. When moving on the curved rail portions 1B and 1'B, the sliders 2 are directed in the tangential direction of the curved rail portions 1B and 1'B. Therefore, the fixed plates 91 mounted to the sliders 2 rotate about the center O of the radius of curvature. As a result, the distance between the sliders 2 moving on the inner track rail 1 decreases, while the distance between the sliders 2 moving on the outer track rail 1' increases. Since the fixed plates 91 are rotatably mounted to the table 92, the plates permit such variations in the distances between the sliders 2 and enable smooth motion of the sliders 2.

FIGS. 21 and 22 show a moving table device using a universal guide device in accordance with the present invention, the moving table device forming a fourth embodiment of the present invention. In this fourth embodiment, the first track rail 1 and the second track rail 1' are mounted in parallel, and two sliders 2 are mounted to both of the rails 1 and 1'. These four sliders 2 support the table 92, in the same way as in the third embodiment described above. However, the moving table device in accordance with the fourth embodiment differs from the moving table device in accordance with the third embodiment in that the four sliders 2 have their respective rotary bearings 90 and that the table 92 is rotatably held by the rotary bearings 90. The rotary bearings 90 are similar in structure to the rotary bearings used in the third embodiment. Shafts mounted at the four corners of the table 92 are rotatably held.

In the moving table device in accordance with this embodiment, the sliders 2 support the four corners of the table 92 and so the table 92 can be held more stably than in the third embodiment. Since the four sliders 2 are rotatably held to the table, the sliders 2 moving on the curved guide rail portions 1B and 1'B rotate arbitrarily and independently and are directed in tangential directions θ1, θ2, θ3, and θ4 of the curved guide rail portions 1B, 1'B, as shown in FIG. 22. This permits smooth motion of the sliders 2.

When the table 92 moves between the track rails 1 and 1'having different radii of curvature as encountered when moving from the straight regions 1A, 1'A of the rails 1, 1' to the curved regions 1B, 1'B, if the distance between the sliders 2 is kept constant, the sliders 2 will be hindered in their movement by the rails 1 and 1', hindering smooth movement of the table 92. However, gaps are provided between the sliders 2 and the rails 1, 1' by setting the width of rails 1 and 1' narrower as mentioned above. The gaps eliminate the interference between the sliders 2 and the rails 1, 1', assuring smooth movement of the sliders 2.

What is claimed is:

1. A universal guide device comprising:

a track rail including a straight region and at least one curved region shaped into an arc having a given radius of curvature, and having ball-rolling surfaces formed on the two opposite side surfaces along a longitudinally direction of said track rail;

a slider formed a saddlelike shape and mounted on said track rail, having load-rolling surfaces which are located opposite to said ball-rolling surfaces of said track rail, and having endless circular paths which including said load-rolling surfaces;

a number of balls rolling in said endless circular path formed in said slider, sustaining a load between said ball-rolling surfaces of said track rail and said load-rolling surfaces of said slider; and wherein said load-rolling surfaces are shaped linearly and said curved region of said track rail is set narrower than said straight region of said track rail.

2. The universal guide device of claim 1, wherein the balls sustain a load between the arc-shaped ball-rolling surfaces along a longitudinally direction of said track rail and the straight load-rolling surfaces formed on said slider, when said slider moves through the curved region of said track rail.

3. The universal guide device of claim 1, wherein some of said balls rolling on said load-rolling surfaces on said slider sustain a load between the ball-rolling surfaces on said track rail and the load-rolling surfaces on said slider, when said slider moves through the curved region of said track rail.

4. The universal guide device of claim 1, wherein said track rail has an upward ball-rolling surface which formed on a top surface of said track rail, said slider has a downward load-rolling surface opposite to said upward ball-rolling surface of said track rail, and said upward ball-rolling surface in said curved region of said track rail is set to such a width that all the balls rolling on the downward load-rolling surface of said slider simultaneously touch said upward ball-rolling surface.

5. The universal guide device of claim 1, wherein said track rail has two curved regions bent in different directions, right and left.

6. The universal guide device of claim 1, wherein said track rail is constructed by combining a straight guide rail and a curved guide rail.

7. The universal guide device of claim 6, wherein said track rail has an intermediate rail that connects said straight guide rail with said curved guide rail, and wherein said intermediate rail has a width that continuously varies from the end of said straight guide rail to the end of said curved guide rail.

\* \* \* \* \*